United States Patent [19]

Luderer

[11] Patent Number: 4,651,318
[45] Date of Patent: Mar. 17, 1987

[54] SELF-ROUTING PACKETS WITH STAGE ADDRESS IDENTIFYING FIELDS

[75] Inventor: Gottfried W. R. Luderer, Naperville, Ill.

[73] Assignee: American Telephone and Telegraph Company AT&T Bell Laboratories, Murray Hill, N.J.

[21] Appl. No.: 676,650

[22] Filed: Nov. 30, 1984

[51] Int. Cl.[4] .................................. H04Q 11/04
[52] U.S. Cl. ..................................... 370/94; 370/60
[58] Field of Search ................................ 370/60, 94

[56] References Cited

U.S. PATENT DOCUMENTS

| | | | |
|---|---|---|---|
| 4,049,906 | 9/1977 | Hafner et al. ........................ | 178/2 |
| 4,399,531 | 8/1983 | Grande et al. ....................... | 370/60 |
| 4,488,288 | 12/1984 | Turner ................................ | 370/60 |
| 4,566,095 | 1/1986 | De Vault et al. .................... | 370/94 |

FOREIGN PATENT DOCUMENTS

| | | |
|---|---|---|
| 0097351 | 1/1984 | European Pat. Off. . |
| 2246144 | 4/1975 | France . |
| 2538984 | 7/1984 | France . |

OTHER PUBLICATIONS

"Distributed Routing and Relay Management in Mobile Packet Radio Network", Compcon '80-20-First IEEE Computer Society International Conference, Sep. 23-25, 1980, (New York, U.S.), J. Liu, pp. 235-243.
"Routing Techniques Used in Computer Communication Networks", IEEE Transactions on Communications, vol. COM-28, No. 4, Apr., 1980, (New York, U.S.), N. Schwartz, et al., pp. 539-552.
"Proposed Organisation for Packet-Switched Data—Communication Network", Proceedings of the IEEE, vol. 119, No. 12, Dec., 1972, (London, GB), T. H. Beeforth, et al., pp. 1677-1682.

*Primary Examiner*—Douglas W. Olms
*Attorney, Agent, or Firm*—John C. Moran

[57] ABSTRACT

A multi-stage packet switching network comprising a plurality of packet switch nodes for communicating broadcast and non-broadcast packets each comprising stage identification information and sets of routing information. Each node responsive to receipt of one of the packets for decoding the stage identification information to determine if the packet is a broadcast or a non-broadcast packet. If a broadcast packet has been received, the switch node transmits this packet to the next sequential stage on all output links interconnecting the switch node to the next sequential stage. If the packet is of the non-broadcast type, the switch node decodes the stage identification field to determine which of the sets of the routing information is to be used for routing the non-broadcast packet to the next sequential stage. Before routing the non-broadcast packet to the next sequential stage, the switch node increments the stage identification field. The switch node contains the necessary circuits for performing the incrementing of the stage identification field of a non-broadcast packet and for bypassing the adder circuit for a non-stage identification information portions of the packet and for bypassing the adder circuit for stage indentification field of the broadcast packet.

14 Claims, 12 Drawing Figures

| START BIT | PACKET LENGTH | DEST TRUNK CNTRLR | STAGE IDEN-TIFIER | SOURCE TRUNK CNTRLR | CONTROL | ARRIVAL TIME | PACKET IDENTIFIER | | LOGICAL ADDRESS | TIME STAMP | 2 | DATA | CRC |
|---|---|---|---|---|---|---|---|---|---|---|---|---|---|
| | | 110000 | 10 | 60 | 0 | | | 1 | | | | | |

FIG. 9

SELF-ROUTING PACKETS WITH STAGE ADDRESS IDENTIFYING FIELDS

TECHNICAL FIELD

This invention relates to a method for the communication of packets through a self-routing packet switching system. In particular, the invention relates to the utilization of the routing information contained within packets being communicated through the packet switching system.

BACKGROUND OF THE INVENTION

Figure 1:
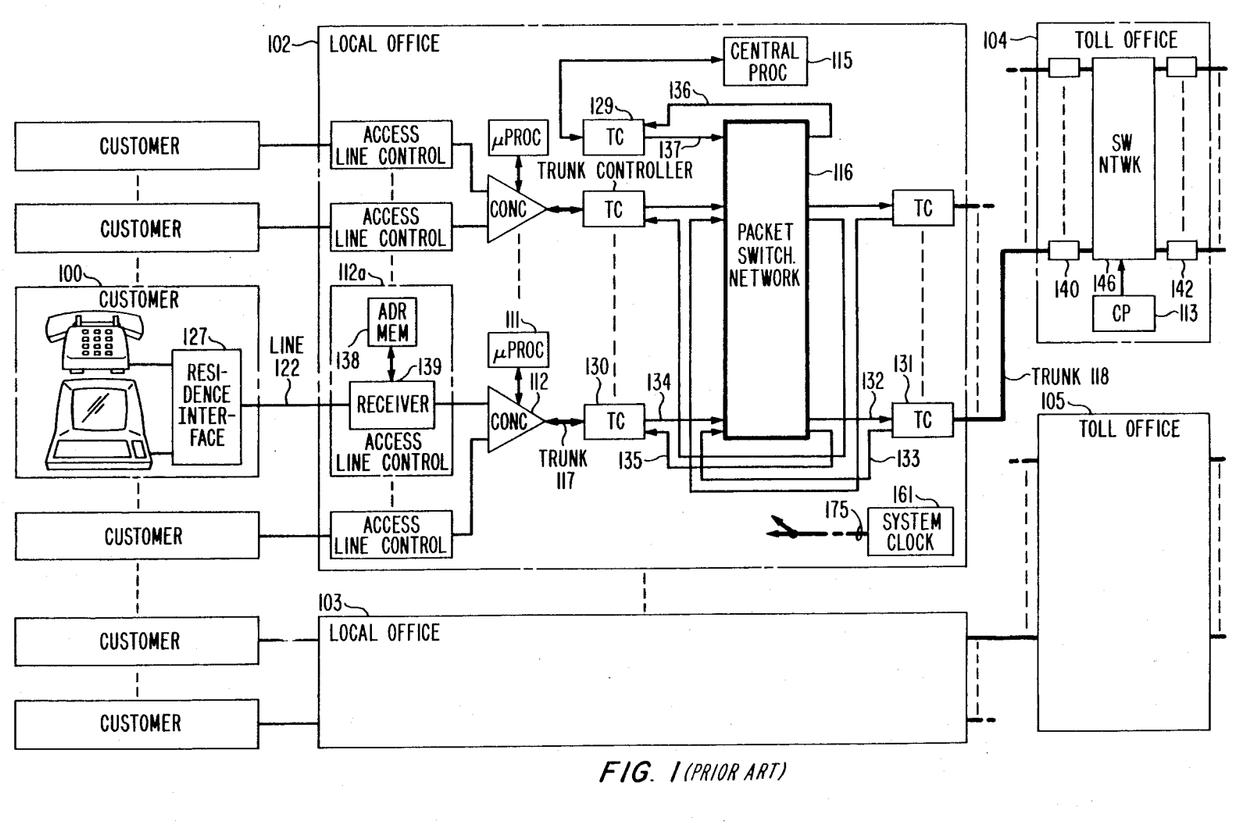
FIGS. 1 and 2 are block diagrams of a prior art packet switching system in which a switch node, in accordance with this invention, may be utilized.
Figure 2:
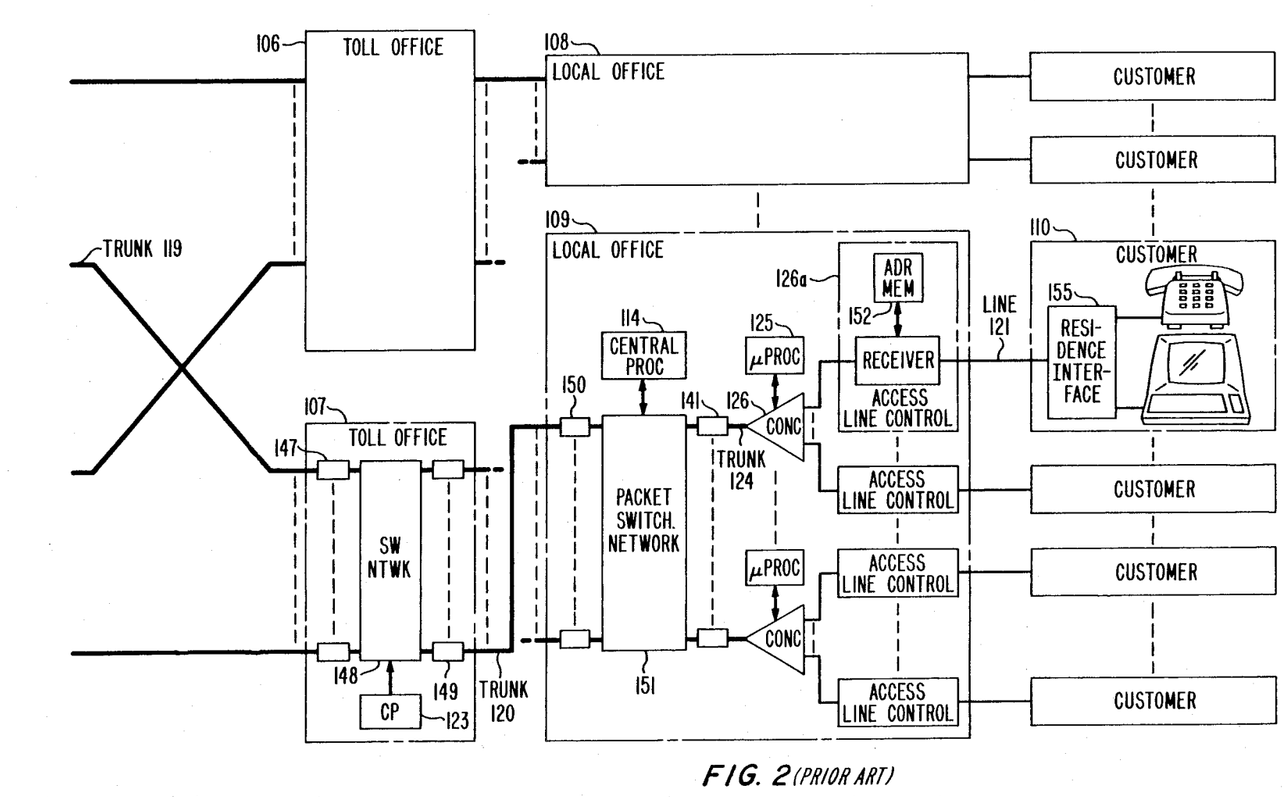

The advantages of using a network comprising switching elements which route packets of data through the network on the basis of an address contained within the packet are known. Such networks are commonly called binary routing networks. A specific example is the butterfly or banyan network. In this type of network, there exists only one unique path between any two network terminations. The network comprises a plurality of stages each having a number of switch nodes. The stages are interconnected by means of links. Each switch node, upon receipt of a packet, is responsive to contents of an address field to properly route the packet to the next stage via an interconnecting link. One such system of this type was disclosed in the U.S. Pat. No. 4,491,945 of Jonathan S. Turner. The system disclosed in the Turner patent is illustrated in FIGS. 1 and 2 which show an illustrative packet switching system having a plurality of local offices 102, 103, 108, and 109, and a plurality of toll offices 104 through 107 serving a plurality of customers such as customers 100 or 110. As described in the Turner application, call setup and call reply packets are utilized by the customers in order to set up a logical path through the different packet switching networks. The system works using two different types of packets for the communication of data. Trunk packets are utilized for the transmission of information on high-speed digital trunks such as trunk 118 between trunk controllers 131 and 140. The transfer of information between trunk controllers through a packet switching network is via switch packets such as communication between trunk controllers 130 and 131 via packet switching network 116. A switch packet comprises the trunk packet plus additional information necessary for routing the packet through the packet switching network. A trunk controller is responsive to a trunk packet to form the switch packet and, in particular, to insert into the destination trunk controller field of the switch packet the address necessary to route the packet through the packet switching network. The necessary logical-to-physical address translation is stored in the trunk controller by an associated central processor such as central processor 115 in response to the call setup and call reply packets.

Figure 4:
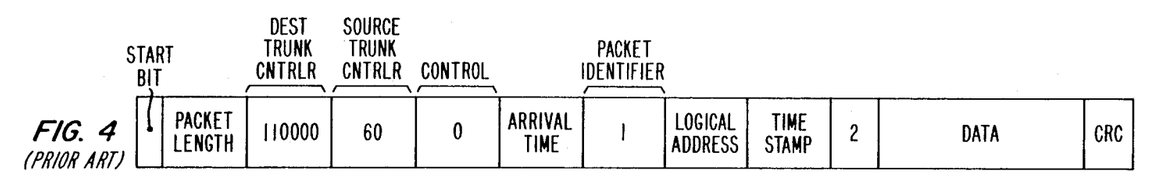
FIGS. 4 and 5 illustrate a prior art packet format.
Figure 5:
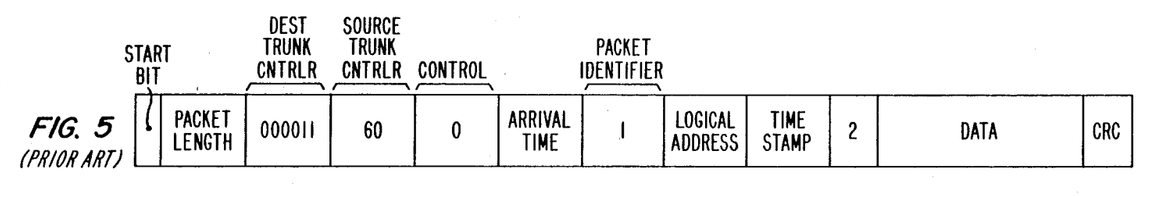

A prior art switch packet is illustrated in FIG. 4. As the switch packet of FIG. 4 is routed through switching network 116, each stage in the network rotates the contents of the destination trunk controller field to the left by 2 bits. This positions the destination trunk controller address so that the next stage can respond to the two most significant bits. For example, FIG. 5 illustrates the switch packet of FIG. 4 after it has been transferred through the first stage.

Whereas the scheme of rotating the address field allows the next sequential stage to immediately respond to the address, it suffers from the problem of not allowing the use of broadcast packets (those which are sent to all nodes) and requires complex circuitry for performing the address rotation.

SUMMARY OF THE INVENTION

In an illustrative method and structural embodiment, a departure in the art is achieved by a switch node within a switching stage utilizing a stage identifier field within a packet to designate which of a plurality of sets of routing information is to be used within a particular stage for determining the communication path to the next sequential stage. Before the packet is communicated to the next sequential stage, the stage identifier field is incremented by one so that the next subsequent stage may select another set of routing information.

The structural embodiment comprises a multistage packet switching network having a plurality of stages, each comprising a plurality of switch nodes. The switch nodes are responsive to broadcast and non-broadcast packets each having sets of route address information and stage identification information for communicating these packets to a switch node in the next sequential stage. Each node is responsive to non-broadcast packets for routing the latter to the next sequential stage in response to the stage identification information and a set of the routing information. The node is further responsive to a broadcast packet for routing this packet to a plurality of switch nodes in the next sequential stage.

Advantageously, the switch node is responsive to the stage identification information of a non-broadcast packet to generate designating signals, and a circuit within the switch node is responsive to the designating signals for selecting a set of routing information signals. The node is then responsive to the selected routing information signals for communicating the non-broadcast packet to the next sequential stage. In addition, in response to the absence of the designating signals, another circuit within the switch node transmits the packet to a plurality of switch nodes in the next sequential stage.

Advantageously, before communicating the non-broadcast packet to the next stage, the switch node updates the stage identification information so that the receiving node in the next sequential stage can select another set of routing information. The updating is performed by a circuit which adds a one to the stage identification information of a non-broadcast packet, and a data selection circuit that either selects the incremented stage identification information of the non-broadcast packet or the unmodified stage identification information of the broadcast packet.

An illustrative method routes broadcast and non-broadcast packets by selecting a set of route address information designated by stage identification information in each of the packets. The routing is performed by switch nodes each having a plurality of input control circuits each connected to one of a plurality of input links and a plurality of output control circuits each connected to one of a plurality of output links with intra-links connecting each of the input control circuits to an individual one of the output control circuits. The method comprises the steps of routing one of the non-broadcast packets to one of the output control circuits via one of the intra-links in response to stage identification information and a set of routing information contained within the non-broadcast packet and routing a broadcast packet to all of the output control circuits in response to the stage identification information of the broadcast packet.

In addition, the method further comprises the steps of decoding the stage identification information of the non-broadcast packet in order to generate signals designating one of a plurality of sets of routing information signals in the packet; and on the basis of the designating signals, selecting the designated set of routing information signals, for communicating the non-broadcast packet to the next sequential stage. Also, the stage identification information of the non-broadcast packet is incremented by one, thereby updating the stage identification information to facilitate the routing of the non-broadcast packet by the next sequential stage.

An illustrative method routes a packet from an input terminal of a switching network to a group of output terminals of the switching network. The packet comprises routing information and stage identification information that indicates broadcast and non-broadcast type routing. If the stage identification information indicates non-broadcast routing, the stage identification information also designates a set of the routing information to be utilized by a receiving node to route the packet to the node of the next sequential stage. The method comprises the steps of routing the packet to a switch node of the next sequential stage selected by a set of routing information identified by the stage identification information, updating the stage identification information, communicating the updated packet by the switch node of the next stage to all switch nodes of the next sequential downstream switching stage connected to the switch node of the next step upon the stage identification information having been updated to indicate a broadcast type routing, and transferring copies of the updated packet by all of the switch nodes of the downstream stage to the group of output terminals.

BRIEF DESCRIPTION OF THE DRAWING

In general, system elements, when first introduced on a figure, are each designated with a number that uses the figure number as the most significant digits of the element number.

DETAILED DESCRIPTION

Figure 6:
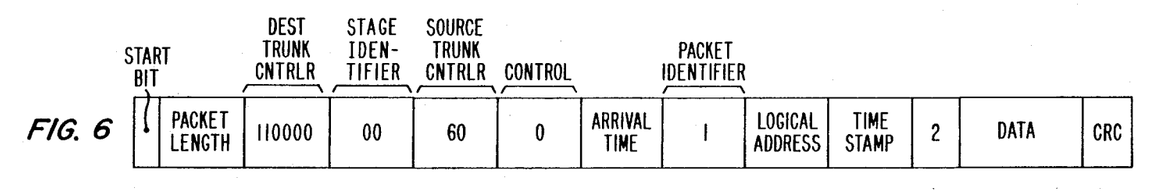
FIGS. 6, 7, and 8 illustrate packet formats for utilization with the present invention.

An illustrative packet is shown in FIG. 6, which utilizes a stage identifier field within the switch packet to designate certain address bits within a destination trunk controller field of the switch packet. These address bits of the destination trunk controller field should be used for routing the packet through the switch node to the next sequential stage. Before routing the switch packet to the next sequential stage, the switch node increments the stage identifier field by one so that the next subsequent switch node will utilize different address bits of the destination trunk controller field for designating the routing of the switch packet. In addition, if the stage identifier field contains all "1's" indicating a broadcast type packet, the switch node automatically transfers this packet to all of the nodes of the next stage to which the switch node is interconnected. This broadcast capability can be used in two ways. First, the capability allows a packet entering any input terminal of the switching network to be routed to every output terminal of the network. Second, a packet can be routed to a sequential group of output terminals from an input terminal.

Figure 3:
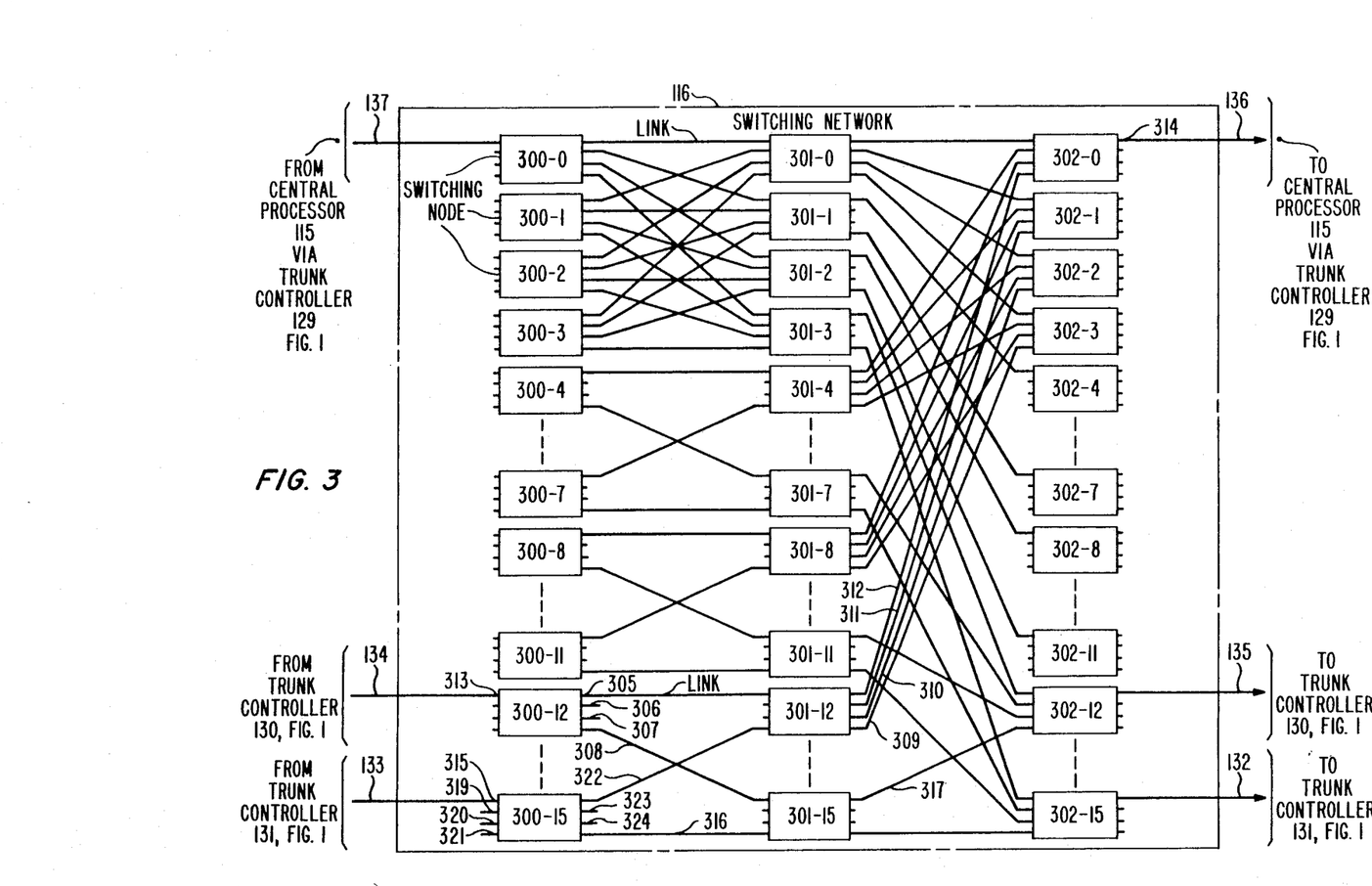
FIG. 3 is a block diagram of a packet switching network utilizing the switch node of this invention.

As will be described later in greater detail, each node illustrated in FIG. 3 is designed in accordance with the node design illustrated in FIGS. 9 and 10. If the latter node design is utilized in FIG. 3, the switch nodes of FIG. 3 are responsive to the packet illustrated in FIG. 6 in the following manner. Network 116, as illustrated in FIG. 3, comprises three stages of switch nodes. The first stage comprises nodes 300-0 through 300-15, the second stage comprises switch nodes 301-0 through 301-15, and the third stage comprises switch nodes 302-0 through 302-15. Transmission through the network is from left to right. Each switch node is, in reality, a packet switch. Each packet switch has four inputs and is capable of buffering one packet on each input. The packets received on any input are transmittable on any of the four output terminals of the packet switch. After receipt of a packet on an input terminal, the address contained in that packet is used to determine which output terminal should be used to transmit the packet. In the case of a broadcast packet, the packet is transmitted out on all of the output terminals. Only the 2 bits of the address field contained within the destination trunk controller field, as designated by the contents of the stage identifier field, are used to select the output terminal for a particular switch node. For example, switch node 300-12 transmits the packet on link 305 if the designated bits are equal to zero, on link 306 if the designated bits are equal to one, on link 307 if the designated bits are equal to two, and on link 308, if the designated bits are equal to three.

Each node properly increments the stage identifier field so that the receiving switch node in the next stage selects the correct bits in order to determine which output terminal should be used to transmit the packet at that stage.

Figure 7:
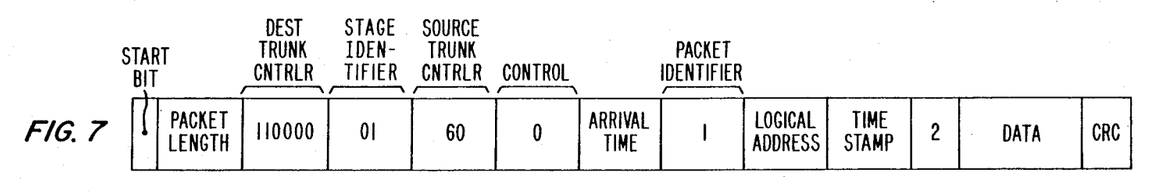
Figure 8:
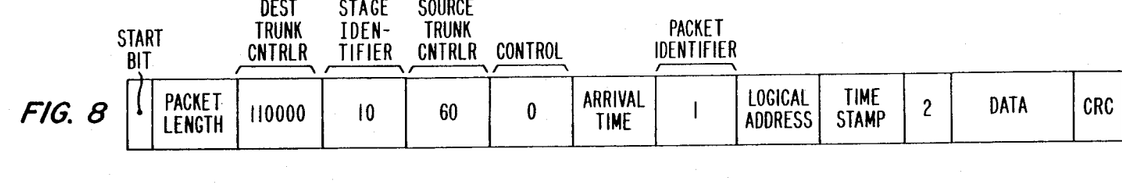

The operation of switching network 116, as illustrated in FIG. 3, can be better understood by considering the example of switching the packet illustrated in FIG. 6 through the network from trunk controller 131 to trunk controller 130. As described in the previously referenced Turner application which is hereby incorporated by reference, the packet shown in FIG. 6 is initially formed by trunk controller 131 from a trunk packet received from trunk 118. This switch packet is formed from the original packet by removing the flags and stuffed bits, and then adding new fields of start bit, packet length, destination trunk controller, stage identifier, source trunk controller, control, arrival time, and a new CRC field. Upon receiving the packet illustrated in FIG. 6, switch node 300-15 examines the two most significant bits in response to the stage identifier bits being equal to "00" and selects link 316 to transmit the packet shown in FIG. 7. Before switch node 300-15 starts to transmit the packet via link 316, switch node 300-15 increments the stage identifier field by one, resulting in the packet shown in FIG. 7. Upon receiving the packet from switch node 300-15, switch node 301-15 examines the two middle bits of the destination trunk controller field, in response to the stage identifier field containing a "01", and selects output 317 to transmit the packet out. Before transmitting the packet, switch node 301-15 performs an increment operation on the stage identifier field resulting in the packet shown in FIG. 8. Upon receiving the packet of FIG. 8, switch node 302-12 responds to the destination trunk controller field by transmitting the packet to trunk controller 130 via conductor 135 since the stage identifier field contains a "10". Switch node 302-12 also performs the increment operation on the stage identifier field. Upon receiving the packet illustrated in FIG. 8, trunk controller 130 forms a new trunk packet by stripping off the information relating to the switch packet and then retransmitting this new trunk packet on trunk 117.

The operation of switching network 116, as illustrated in FIG. 3, will now be further explained with respect to the utilization of the broadcast capability. A packet can be transmitted from trunk controller 131 to all of the output links 132 to 136 by inserting a "11" into the stage identifier field before transmission of the packet to switching network 116. Switch node 300-15 is responsive to the stage identifier field containing "11" to transmit copies of the packet on output links 316, and 322 through 324. This results in the packet being transmitted to switch nodes 301-12 through 301-15. Each of the switch nodes 301-12 through 301-15 is responsive to the stage identifier bits being equal to "11" to transmit additional copies of the packet on the links attached to the outputs of the latter switch nodes. This results in the packet being transmitted to all of the switch nodes 302-0 through 302-15 that comprise the third stage of switching network 116. All of the switch nodes of the third stage are responsive to the stage identifier bits being equal to "11" to transmit the packet to all of the trunk controllers attached to the third stage such as trunk controller 130 or 131.

The operation of switching network 116 in transmitting a packet from one input link to a group of output links is now illustrated by the following example. In order for trunk controller 131 to transmit a packet to output links 132 through 135, the destination trunk controller field contains "xxxx11" where the "x" indicates a don't care binary state and the stage identifier field contains "10". In response to receipt of this packet via link 133, switch node 300-15 selects from the destination trunk controller field "11" as designated by the stage identifier field containing "10". Switch node 300-15 transmits this packet via link 316 to switch node 301-15 after incrementing the stage identifier field to "11". Since the stage identifier field contains "11" indicating a broadcast packet, switch node 301-15 transmits the packet to switching nodes 302-12 through 302-15 via the appropriate links. Since the stage identifier field contains "11", switch node 301-15 does not increment the stage identifier field before transmitting it to the previously mentioned switch nodes. Switch nodes 302-12 through 302-15 are responsive to the received packets having switch identifier fields equal to "11" to transmit these packets on all of the output links connected to the latter switch nodes. This results in copies of the packet being transmitted on the output links 132 through 135.

Figure 9:
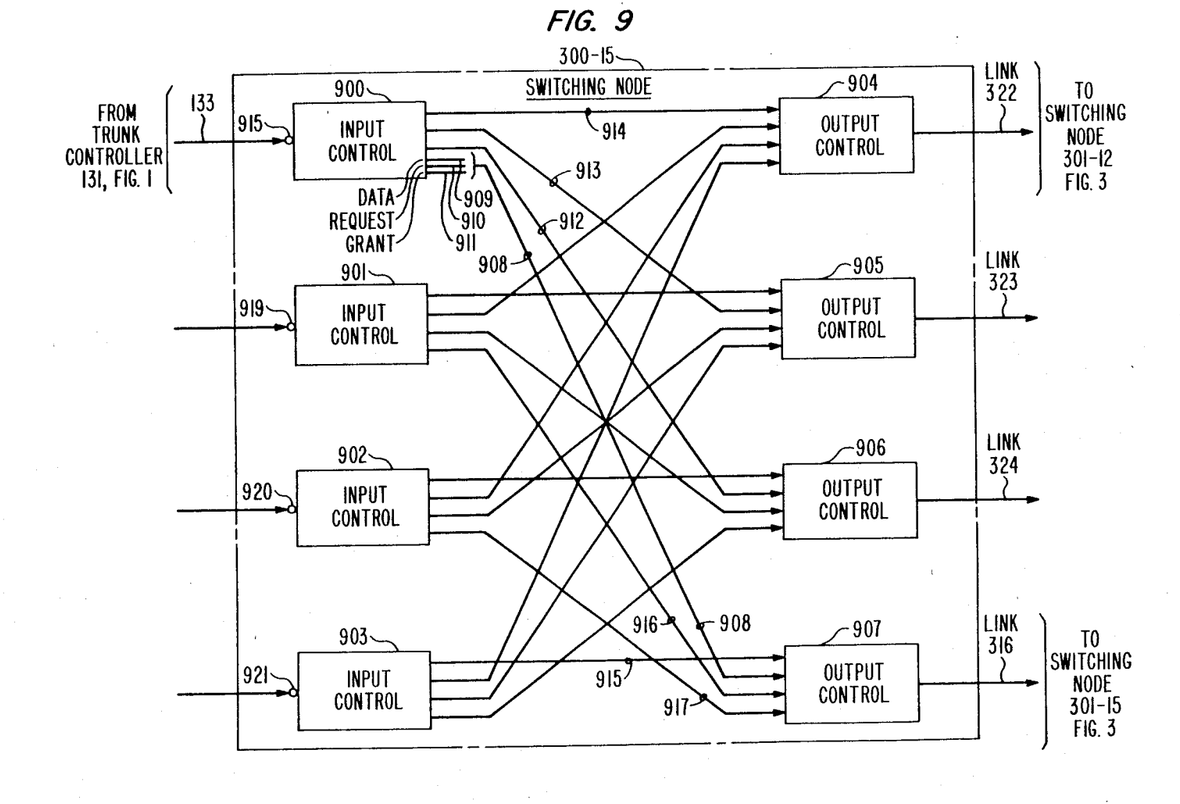
FIG. 9 illustrates a switch node, in accordance with the present invention.

Switch node 300-15 is illustrated in greater detail in FIG. 9. The other switch nodes are identical in design to switch node 300-15. The switch node consists of four input controls which can transmit information to any one of four output controls. The input controls 900 through 903 are connected to the output controls 904 through 907 via cables. For example, input control 900 is connected to output control 907 via cable 908. Cable 908 comprises three conductors, 909, 910, and 911. The other interconnecting cables in FIG. 9 are identical in design to cable 908.

Assuming that a packet is not a broadcast packet, when input control 900 receives a packet to transmit to output control 907, it transmits a request signal over conductor 910 to output control 907. Input control 900 continuously transmits this request signal until the entire packet has been transmitted to output control 907. When output control 907 is free to receive information from input control 900, output control 907 transmits a grant signal via conductor 911 to input control 900. Upon receipt of the grant signal, input control 900 commences to transmit the packet to output control 907 via conductor 909. In the case of a broadcast packet, input control 900 transmits request signals to output control 904 through 907 and waits until a grant signal is received back from each of the output controls before commencing transmission of the broadcast packet to all of the output controls simultaneously over the appropriate cables. Details of the output controls are given in greater detail in the Turner application.

For example, the non-broadcast packet shown in FIG. 6 would be transmitted through switch node 300-15, as illustrated in FIG. 9, in the following manner. When input control 900 recognizes the start bit, it has already received not only the start bit, but also the address field and the stage identifier field bits. Input control 900 decodes the two most significant bits of the network address field in response to the contents of the stage identifier field containing a "00" and determines that the packet is to be transmitted to output control 907 via cable 908. Input control 900 requests permission to start transmission via conductor 910; and when output control 907 returns the grant signal via conductor 911, input control 900 starts the transmission of the packet to output control 907 via cable 908. Before transmitting the stage identifier field, input control 900 increments this field by one so that the contents of the stage identifier field transmitted are those shown in FIG. 7. Upon receipt of the start bit of the packet, output control 907 starts to transmit this packet out on link 316.

Figure 10:
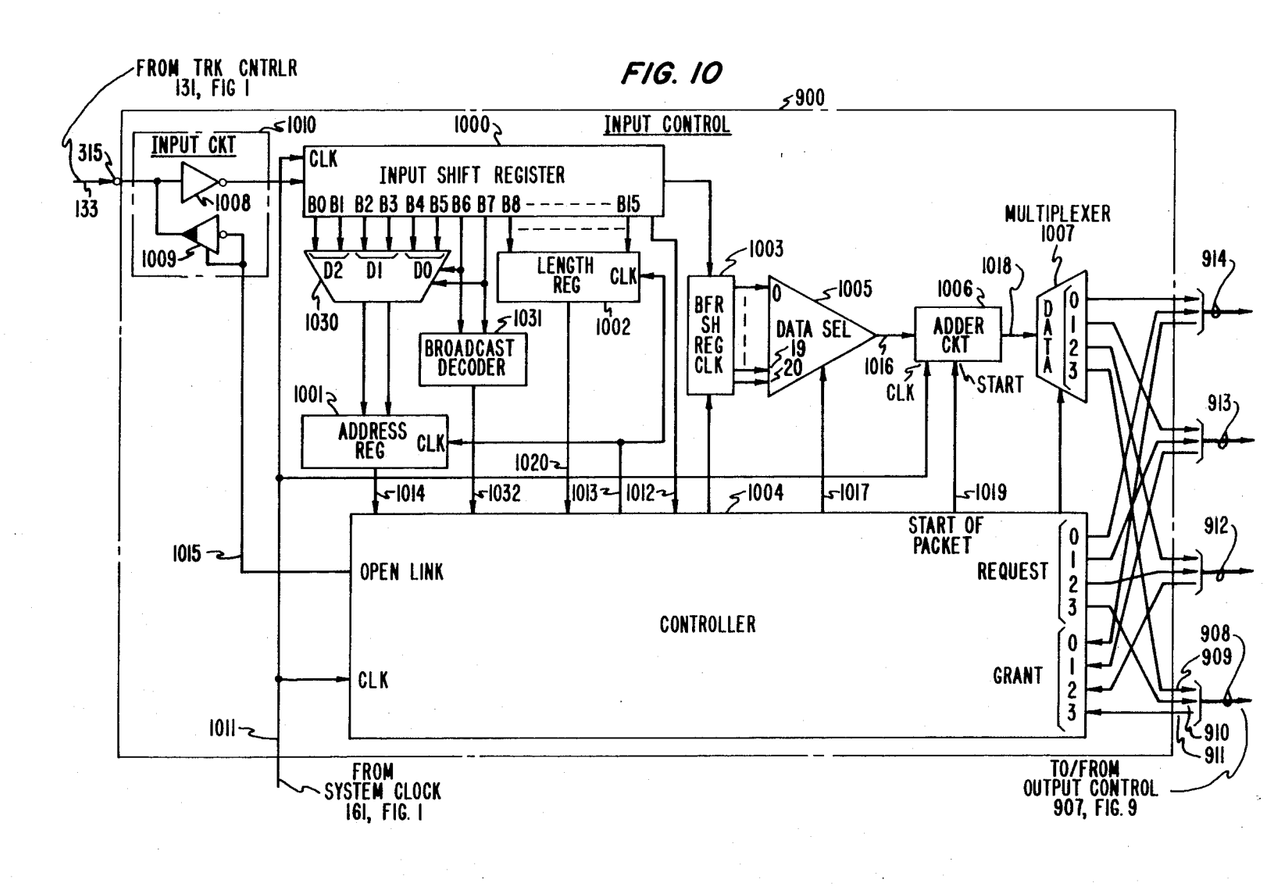
FIG. 10 illustrates the input control block of the switch node illustrated in FIG. 9.

Input control 900 of FIG. 9 is shown in greater detail in FIG. 10. Input circuit 1010 receives the information from input terminal 315 and transmits to trunk controller 131 of FIG. 1 the link open signal via input terminal 315 under control of controller 1004. The function of the link open signal is explained in greater detail in the incorporated Turner application. Input shift register 1000 is used to detect the start bit, that indicates the beginning of a packet. In addition, input shift register 1000 is used to extract the network packet length field, which is saved in length register 1002, and to extract the stage identifier bits that are used to control data selector 1030. In response to the latter bits, data selector 1030 selects the proper address bits from the destination trunk controller field and these bits are subsequently stored in address register 1001. Buffer shift register 1003 is capable of buffering one complete packet. Buffer shift register 1003 provides an output after each 64 bits of storage. These outputs can be selected by data selector 1005, under control of controller 1004, to bypass unused portions of the buffer shift register 1003. This bypassing is done when it is not necessary to buffer a whole packet before transmission of the packet can start to the output circuit and is done to speed up the transfer of a packet through input control 900. Adder circuit 1006 performs the previously mentioned incrementing of the stage identifier field before this field is transmitted with the remainder of the packet to the selected output control. Multiplexer 1007, under control of controller 1004, selects on which of the cables 908, 912, 913, or 914 the data is to be transmitted.

The operation of input control 900 will now be further explained by using the previous example which dealt with the transmission of the packet shown in FIG. 6. Input shift register 1000 is continuously being clocked by system clock 161 via conductor 1011. As data is received via input terminal 315, it is clocked through input shift register 1000. Once the start bit reaches bit position 15 of input register 1000, controller 1004 detects this bit and transmits a signal on conductor 1013. Prior to the transmission of this signal, data selector 1030 is responsive to the contents of bit positions 5 and 6 to select the two most significant bits of the destination controller field, "11"; and then, the output of data selector 1030 is strobed into address register 1001 by the signal on conductor 1013. Data selector 1030 selects the most significant bits since the contents of the stage identifier field are "00".

Controller 1004 transmits a request via conductor 910 to output control 907 since the selected address bits indicate that the packet is to be transmitted to this output control. While this request is being made, data is being shifted from the input shift register 1000 to buffer shift register 1003 which has a number of output terminals. These output terminals are connected to different bit positions within buffer shift register 1003. When controller 1004 receives a grant signal from output control 907 via conductor 911, controller 1004 calculates at which output of the buffer shift register 1003, the start bit of the packet is approaching within buffer register 1003. This is done so that the transmission of the packet to output control 907 can start as soon as possible. On the basis of this calculation, controller 1004 controls data selector 1005 to select the designated output of buffer shift register 1003. The control information is transmitted to data selector 1005 via cable 1017. Data selector 1005 transmits the data from the selected output of buffer shift register 1003 to adder circuit 1006 via conductor 1016. Before transmission of the data, controller 1004 initializes adder circuit 1006 by transmitting the start of the packet signal via conductor 1019. Controller 1004 then uses the packet length information stored in length register 1002, which it reads via cable 1020 to determine when the end of the packet has entered the input shift register. When this occurs and the transmission has started from shift register 1003, controller 1004 transmits the link open signal via conductor 1015. The link open signal indicates that input control 900 is now ready to receive another packet. The use of the link open signal is explained in greater detail in the Turner application in the section dealing with the output control circuit.

Now, consider the situation where the packet received by input control 900 is a broadcast packet. Input shift register 1000 is continuously being clocked by the system clock via conductor 1011. Once the start bit reaches bit position 15 of input shift register 1000, broadcast decoder 1031 detects the presence of all ones in the stage identifier field and transmits a signal to controller 1004 via conductor 1032. In response to the latter signal and the start bit, controller 1004 transmits requests via conductors 910, 912, 913, and 914. While these requests are being made, data is once again shifted from input shift register 1000 to buffer shift register 1003. When the grant signals are received back from the output controllers, controller 1004 properly conditions multiplexer 1007 so that the data is shifted out to all four of the output controls connected to the four output cables of input control 900. Controller 1004 does not transmit the signal on conductor 1019 to adder 1006, thus disabling the latter from incrementing the stage identifier field.

Figure 11:
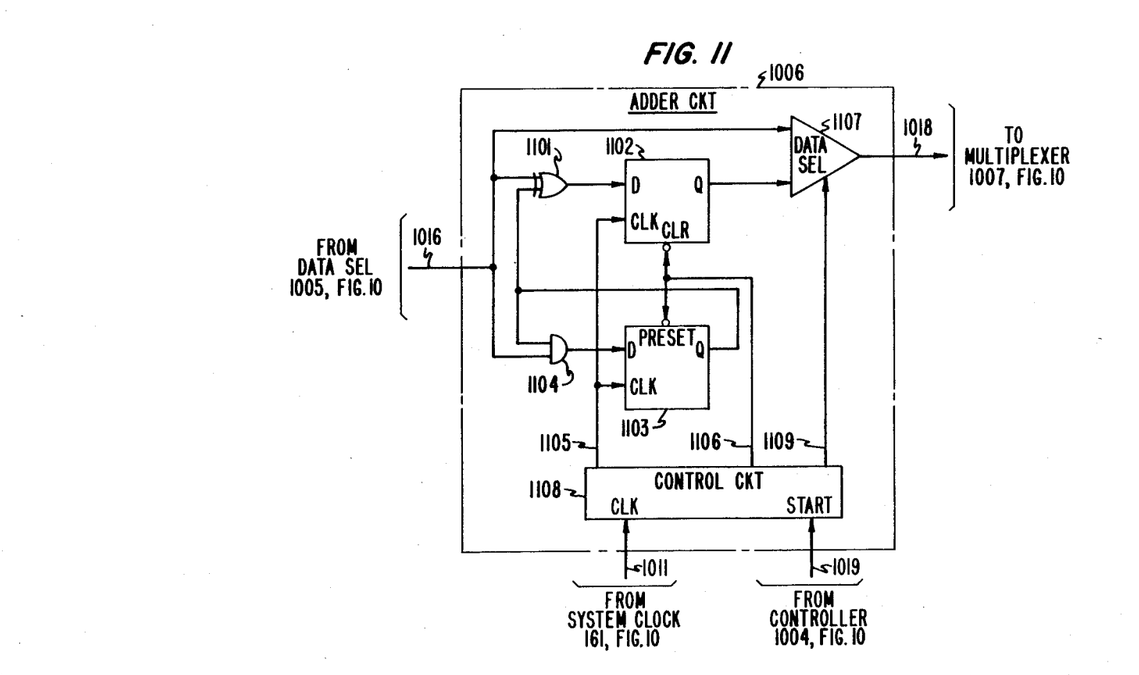
FIG. 11 illustrates the adder circuit 1006 of input control 900 as illustrated in FIG. 10.
Figure 12:
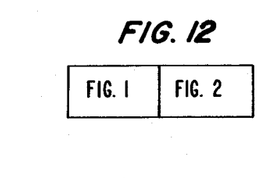
FIG. 12 illustrates the combination of FIGS. 1 and 2.

Adder circuit 1006 is illustrated in greater detail in FIG. 11. The purpose of circuit 1006 is to serially increment the stage identifier field by one. The addition is necessary so that the next input control decodes the correct 2 bits of the destination trunk controller field. Control circuit 1108 controls the overall operation of adder circuit 1006. When the stage identifier field is not present in the data being communicated via conductor 1016, control circuit 1108 conditions data selector 1107 via conductor 1109, such that the information communicated via conductor 1016 is transmitted directly to multiplexer 1007 via conductor 1018. When the stage identifier field first becomes present on conductor 1016, controller 1004 of FIG. 10 transmits a signal on conductor 1019 to control circuit 1108. In response to the latter signal, control circuit 1108 initializes flip-flops 1102 and 1103 by resetting flip-flop 1102 and presetting flip-flop 1103. Control circuit 1108 then supplies the proper clock information to these flip-flops via conductor 1105 and conditions data selector 1107 to transmit the output of flip-flop 1102 to multiplexer 1007 via conductor 1018. Flip-flop 1102 is utilized for buffering the results of the additions performed by exclusive OR gate 1101 for transmission to multiplexer 1007 of FIG. 10 via data selector 1107. AND gate 1104 determines whether or not a carry has occurred on the present serial addition and stores this fact in flip-flop 1103. Since flip-flop 1103 is initially set to a "1", this results in the stage identifier field being incremented by one. As each bit of the stage identifier field is serially received on conductor 1016, exclusive OR gate 1101 adds this bit to the contents of the carry in flip-flop 1103 and the result will be stored in flip-flop 1102 and transmitted via data selector 1107 to multiplexer 1007 via conductor 1018.

It is to be understood that the above-described embodiment is merely illustrative of the principles of this invention; other arrangements may be devised by those skilled in the art without departing from the spirit and scope of this invention.

What is claimed is:

1. A multi-stage packet switching network for switching packets each comprising routing information and having switching stages each comprising a plurality of switch nodes, comprising:

each of said packets further comprising stage identification information indicating broadcast and non-broadcast type ones of said packets;

said routing information comprising groups of signals with each group corresponding to one stage of said network;

each of said nodes comprises means for decoding said stage identification information of one of said non-broadcast packets to generate signals designating one of said groups of routing information signals upon said stage identification information indicating a non-broadcast packet;

means responsive to said designating signals for selecting the designated one of said groups of routing information signals;

means responsive to the selected group of routing information signals for communicating said packet to a switch node of said next sequential stage; and means responsive to a stage identification information of a broadcast one of said packets for routing said broadcast packet to a plurality of switch nodes in said next sequential stage.

2. The network of claim 1 wherein said nodes each further comprise a means for incrementing said stage identification information upon said stage identification information indicating said one of said non-broadcast packets thereby properly conditioning said stage identification information of said one of said non-broadcast packets for said node of said next sequential stage.

3. The switching network of claim 2 wherein said incrementing means comprises means for adding a one to said stage identification information of said one of said non-broadcast packets;

means for gating said stage identification information of said one of said broadcast packets and said stage identification information of said one of said non-broadcast packets incremented by one;

said broadcast packet routing means comprises means for generating a broadcast signal upon receipt of said one of said broadcast packets; and said gating means responsive to said broadcast signal for selecting said one of said broadcast packets.

4. A switch node for switching broadcast and non-broadcast packets each comprising sets of route address information and stage identification information and said switch node connected to a plurality of input and output links, said switch node comprising:

a plurality of input control means each connected to one of said input links;

a plurality of output control means each connected to one of said output links;

intra-links connecting each of said input control means to all of said output control means;

each of said input control means responsive to one of said non-broadcast packets for routing said one of said non-broadcast packets to one of said output control means in response to said stage identification information indicating one of said sets of said routing information via one of said intra-links; and each of said input control means further responsive to said identification information indicating one of said broadcast packets for routing said one of said broadcast packets to all of said output control means via said intra-links.

5. The switch node of claim 4 wherein said input control means comprises means for decoding said stage identification information of said non-broadcast packet to generate signals designating one of said sets of routing information signals;

means responsive to said designating signals for selecting one of said sets of routing information signals; and means responsive to the selected set of routing information signals for communicating said one of said non-broadcast packets to said next sequential stage via one of said output control means one of said output links.

6. The switch node of claim 5 wherein said input control means further comprises means for routing said one of said broadcast packets upon the absence of said designating signals being generated by said decoding means.

7. The switch node of claim 6 further comprises means for incrementing said stage identification information of said one of said non-broadcast packets thereby updating said stage identification information for utilization by the receiving switch node of said next sequential stage.

8. The switch node of claim 7 wherein said incrementing means comprises means for adding a one to said stage identification information of said one of said non-broadcast packets;

means for selecting said stage identification information of said broadcast packet and said stage identification information of said one of said non-broadcast packets incremented by one;

means for generating a broadcast signal upon receipt of said one of said broadcast packets; and said selecting means further responsive to said broadcast signal for selecting said stage identification information of said one of said broadcast packets.

9. A method of routing broadcast and non-broadcast packets and selecting a set of route address information determined by stage identification information in each of said packets by a switch node comprising a plurality of input control means each connected to one of a plurality of input links, a plurality of output control means each connected to one of a plurality of output links, intra-links connecting each of said input control means to all of said output control means, comprising the steps of:

routing one of said non-broadcast packets to one of said output control means via one of said intra-links in response to said stage identification information indicating one of said sets of said routing information; and routing one of said broadcast packets to all of said output control means in response to said stage identification information indicating said one of said broadcast packets is of the broadcast packet type.

10. The method of claim 9 wherein said step of routing said one of said non-broadcast packets further comprises the step of decoding said stage identification information of said one of said non-broadcast packets to generate signals designating said one of said sets of routing information signals;

selecting one of said sets of routing information signals in response to said designating signals; and communicating said one of said non-broadcast packets to said next sequential stage via one of said output control means and one of said output links in response to the selected set of routing information signals.

11. The method of claim 10 further comprising the step of incrementing said stage identification information of said one of said non-broadcast packets thereby updating said stage identification information for utilization by the receiving switch node of said next sequential stage.

12. The method of claim 11 wherein said incrementing step comprises the steps of adding a one to said stage identification information of said non-broadcast packet;

generating a broadcast signal upon receipt of said broadcast packet; and selecting said stage identification information of said broadcast packet in response to said broadcast signal and said stage identification information of said non-broadcast packet incremented by one upon the absence of said broadcast signal.

13. A method of routing a packet from an input terminal of a switching network to a group of output terminals of said switching network, said packet comprising routing information and stage identification information indicating broadcast and non-broadcast type routing and said stage identification information further designating a set of said routing information upon said stage identification information indicating non-broadcast routing and said switching network having switching stages each comprising a plurality of switch nodes, comprising the steps of:

routing said packet by a receiving switch node to a switch node of the next stage selected by the set of routing information identified by said stage identification information;

updating said stage identification information;

communicating the updated packet by said switch node of said next stage to all switch nodes of a downstream switching stage connected to said switch node of said next stage upon said stage identification field having been updated to indicate a broadcast type routing; and transferring said updated packet by all of said switch nodes of said downstream stage to said group of output terminals in response to said stage identification field indicating said broadcast type routing.

14. The method of claim 13 wherein said step of updating comprises the step of incrementing said stage identification information.

* * * * *